UNITED STATES PATENT OFFICE.

THOMAS P. KAVANAUGH, OF KANSAS CITY, MISSOURI, ASSIGNOR TO THE AMERICAN BISCUIT AND MANUFACTURING COMPANY, OF CHICAGO, ILLINOIS.

MANUFACTURE OF CANDY.

SPECIFICATION forming part of Letters Patent No. 452,793, dated May 26, 1891.

Application filed January 28, 1891. Serial No. 379,427. (No specimens.)

*To all whom it may concern:*

Be it known that I, THOMAS P. KAVANAUGH, a citizen of the United States, residing at Kansas City, in the State of Missouri, have invented certain new and useful Improvements in the Process of the Manufacture of Candy and the Resulting Product Therefrom, of which the following is a specification.

The object of my invention is to produce candy of a much finer quality and greatly superior to that which has been heretofore produced, and which shall not have any ingredients therein injurious to health, while preserving its brilliancy, texture, and clearness under all atmospheric conditions and lapses of time.

I am not aware that it has been possible heretofore to produce fine candies from cane-sugar unadulterated with glucose, except at such cost as is practically prohibitive.

By my invention candies of a high order can be produced from the cheapest grades of cane-sugar, and scarcely distinguishable, if at all, from fine candies produced from the highest and most expensive grades of cane-sugar by former processes.

Of late years nearly all candy, and especially stick candy, has been adulterated with glucose, it having been a common practice to incorporate from twenty-five to fifty or even a greater percentage of glucose with cane sugar or sirup. Glucose, as is well known, is much inferior in purity to cane-sugar, and while it has some desirable qualities—as, for example, in imparting to the candy brilliancy and rendering it hard and non-deliquescent—its inherent impurity and worthlessness as a food product renders it unfit for use.

I have discovered that all of the desirable features of candy produced by boiling cane-sugar and glucose *in vacuo* can be secured by boiling cane sugar or sirup with an acid tartrate, such as acid tartrate of potassium or acid tartrate of sodium, but I prefer the acid tartrate of potassium, commonly known as "cream of tartar," the action of the cream of tartar insuring a heretofore difficult but desired breaking and readjustment of the grain of the sugar. I have found, also, that the combining and association of cream of tartar with cane sugar or sirup, as herein provided for, is an important factor in the clarification of the same and in eliminating or neutralizing any impurities present therein, as well as adding desired qualities to the resulting compound.

The proportion of tartrate of potassium or cream of tartar used with the cane-sugar may be considerably varied; but I have produced a superior candy by the use of five ounces of cream of tartar to two hundred pounds of sugar.

Instead of using the sugar, the cane-sirup may be used. The ingredients may be mixed in any convenient way, and are then boiled *in vacuo* in the ordinary way of manufacturing candy from cane-sugar and glucose—that is to say, the compound of cane-sugar and cream of tartar is boiled in a vacuum-pan at a temperature of about 212° Fahrenheit until the mass assumes the hard crack or stick or other desired candy consistency. Cream of tartar is a valuable ingredient also for other kinds of candy than "hard crack."

I claim—

1. The improvement in the manufacture of candy, which consists in cooking a compound of cane-sugar of low grade and a tartrate *in vacuo* to a consistency appropriate to the kind of candy desired.

2. The improved method or process in the manufacture of candy, consisting in the admixture of approximately five ounces of cream of tartar with two hundred pounds of cane-sugar of low grade, and the boiling, cooking, and clarification of the same *in vacuo* until the product thus obtained reaches the desired candy consistency.

3. As a new article of manufacture, the herein-described candy, composed of low-grade sugar and a tartrate, such as the acid tartrate of potassium, vacuum-cooked, and having as distinguishing characteristics whiteness, hardness, and non-deliquescence.

THOMAS P. KAVANAUGH.

Witnesses:
LOUIS HUGGINS,
ALFRED G. MOREY.